(12) United States Patent
Amro et al.

(10) Patent No.: US 6,278,443 B1
(45) Date of Patent: Aug. 21, 2001

(54) TOUCH SCREEN WITH RANDOM FINGER PLACEMENT AND ROLLING ON SCREEN TO CONTROL THE MOVEMENT OF INFORMATION ON-SCREEN

(75) Inventors: Hatim Yousef Amro, Austin; John Paul Dodson, Pflugerville, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/070,180

(22) Filed: Apr. 30, 1998

(51) Int. Cl.[7] ................................................ G09G 5/00
(52) U.S. Cl. ...................... 345/173; 345/157; 178/18.01; 178/18.05; 178/18.06
(58) Field of Search .................... 345/156, 157, 345/173, 159, 160, 172; 178/18.01, 18.03, 18.05, 18.06, 18.07

(56) References Cited

U.S. PATENT DOCUMENTS

| | | | |
|---|---|---|---|
| 4,550,221 | * 10/1985 | Mabusth | 178/18 |
| 4,684,801 | * 8/1987 | Carroll et al. | 250/221 |
| 4,736,191 | 4/1988 | Matzke et al. | 340/365 |
| 4,977,397 | 12/1990 | Kuo et al. | 340/710 |
| 5,327,161 | 7/1994 | Logan et al. | 345/157 |
| 5,376,946 | 12/1994 | Mikan | 345/157 |
| 5,402,151 | * 3/1995 | Duwaer | 345/173 |
| 5,406,307 | * 4/1995 | Hirayama et al. | 345/120 |
| 5,432,531 | 7/1995 | Calder et al. | 345/173 |
| 5,469,194 | 11/1995 | Clark et al. | 345/173 |
| 5,815,142 | * 9/1998 | Allard et al. | 345/173 |
| 5,956,019 | * 9/1999 | Bang et al. | 345/173 |
| 5,982,302 | * 11/1999 | Ure | 345/22 |

* cited by examiner

Primary Examiner—Bipin Shalwala
Assistant Examiner—Mansour M. Said
(74) Attorney, Agent, or Firm—Leslie Van Leeuwen; J Bruce Schelkopf

(57) ABSTRACT

A computer controlled display system with a user interactive touch screen is provided with an on-screen mouse to which user input may be applied by rolling of the touch finger to thereby move displayed information: the pointer or scrolled information on the screen. Means are provided which are activated by the touching of the screen at any random position selected by the user for enabling the detection of any rolling of said placed fingertip in an orthogonal direction. Also provided are means responsive to the detection of said rolling of said placed fingertip for moving said displayed data in an orthogonal direction corresponding to the direction of said rolling. The data moved may be the cursor or pointer or, when scrolling, the whole screen of data may be moved.

21 Claims, 9 Drawing Sheets

TOUCH SCREEN WITH RANDOM FINGER PLACEMENT AND ROLLING ON SCREEN TO CONTROL THE MOVEMENT OF INFORMATION ON-SCREEN

TECHNICAL FIELD

The present invention relates to user interactive computer supported display technology and particularly to such user interactive systems and methods which are user friendly, i.e. provide even non-computer-literate users with an interface environment which is easy to use and intuitive. More particularly, the present invention relates to touch screen technology, especially user intuitive touch screens through which even novice computer users may access commercial, educational and entertainment information such as that which may be accessed via the Internet.

BACKGROUND OF RELATED ART

The 1990's decade has been marked by a technological revolution driven by the convergence of the data processing industry with the consumer electronics and communications industries. This advance has been even further accelerated by the extensive consumer and business involvement in the internet over the past few years. As a result of these changes, it seems as if virtually all aspects of human endeavor in the industrialized world requires human computer interfaces. There is a need to make computer directed activities accessible to a substantial portion of the world's population which, up to a few years ago, was computer illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

In this connection, there is the touch screen or touch panel. It is easy to use because it allows the user to point directly with his finger to make selections which move a cursor or other element around a display screen. The touch panel in various forms has been in use for several years. Several different technologies have been involved in touch panels. Original touch panels used a series of infrared LEDs and light sensors, such as photodiodes, to provide low resolution panels of up to 50 resolvable positions. The LEDs and sensors form a grid of invisible light beams which the finger breaks to, thus, indicate its position. The capacitively coupled touch panels were able to develop a resolution of about 100 resolvable positions. Higher resolution touch screens have been developed using a variety of technologies from sound waves reflected off fingers to conductive/resistive layers separated by insulative material broken down by touch.

While direct touch screens are simple to use, they do have some eye/hand coordination shortcomings. First, while the finger is a natural pointer, because of its relatively wide dimensions and difficulty in making precise movements in small increments, it has limitations in making movements and selections in high information density/high resolution screens. In this connection, the finger and like direct pointers are also hampered by parallax: if the conventional touch panel is ¼" to ½" from the display, then the user's fingers tend to touch the position on the panel that is aligned with their eyes and the selected point on the display screen and not the position on the touch panel directly perpendicular to the selected point on the display screen.

SUMMARY OF THE INVENTION

The present invention provides a solution to the above-mentioned shortcomings of direct finger access touch screens while still preserving the ease-of-use and naturalness of such touch screens. The invention provides a user interactive touch screen in a computer controlled display system which includes means for displaying data on said touch screen, means for sensing the placement of a user's fingertip adjacent said screen, means responsive to said sensing means for enabling the detection of any rolling of said placed fingertip in an orthogonal direction and means activated by a detection of said rolling of said placed fingertip for moving said displayed data in an orthogonal direction corresponding to the direction of said rolling. In the most significant embodiment, the displayed data which is moved is the cursor. Also, the fingertip is preferably placed in a position remote from the cursor. Thus, the finger does not cover the cursor, which may be small enough to make selections requiring small increments of movement in relatively high information density screens. We have found that the rolling of a finger can precisely control the remote cursor movement. Eye/hand coordination to more precisely position cursors is more easily done with finger rolling, which can be fine tuned with the visual feedback of the resulting remote cursor movement. Also, parallax is no problem because the pointer, i.e. the cursor is on the display screen rather than on the superimposed touch panel, and, thus, the thickness of the touch panel does not matter.

For best results, when the placement of a finger is sensed, there are means responsive to the sensing means for displaying an object indicating that said means for detecting the finger rolling is enabled. These indicating means may simply be a pad image enclosing the fingertip. The screen may be a pressure sensitive screen, in which case it may further include means responsive to a subsequent pressing of said placed fingertip for additional interactive user input.

DETAILED DESCRIPTION OF THE PREFERRED EMBODIMENT

Figure 1:
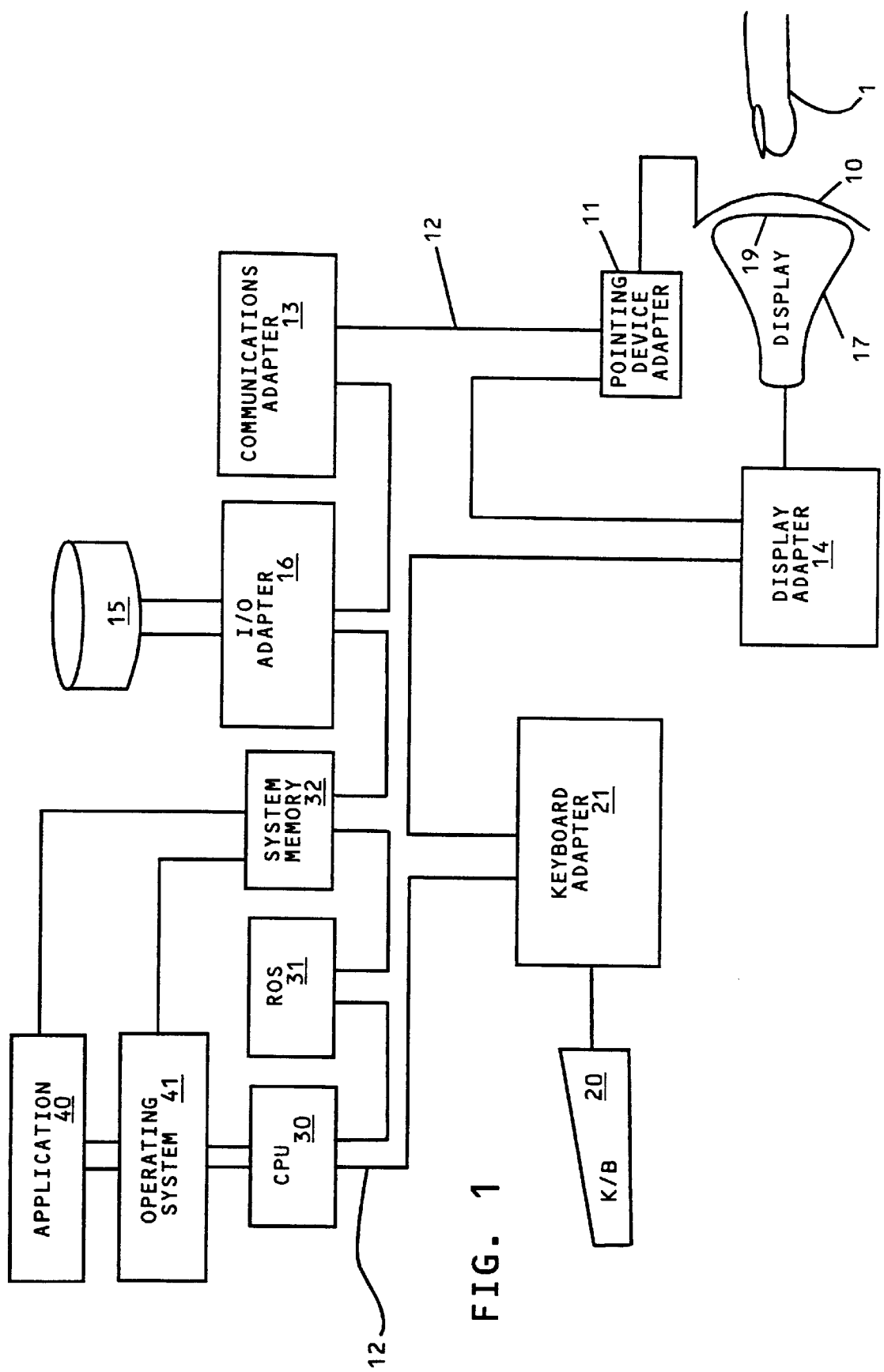
FIG. 1 is a block diagram of a data processing system including a central processing unit and touch panel display which is capable of implementing the present invention.

Referring to FIG. 1, a data processing system is shown which may function as the computer controlled display terminal with interactive touch screen used in implementing the on-screen randomly placeable finger mouse functions of the present invention. A central processing unit (CPU) 30 such as one of the PC microprocessors available from International Business Machines Corporation is provided and interconnected to various other components by system bus 12. An operating system 41 runs on CPU 30 and provides control and is used to coordinate the functions of the various components of FIG. 1. Operating system 41 may be one of the commercially available operating systems such as the OS/2 operating system available from International Business Machines Corporation (OS/2 is a trademark of International Business Machines Corporation); Microsoft Windows 95™ or Windows NT™, as well as UNIX or AIX operating systems. A programming application for operating the on-screen mouse interface of the present invention, application 40, to be subsequently described in detail, runs in conjunction with operating system 41 and provides output calls to the operating system 41 which implement the various functions to be performed by the application 40. A read only memory (ROM) 31 is connected to CPU 30 via bus 12 and includes the basic input/output system (BIOS) that controls the basic computer functions. Random access memory (RAM) system 32, I/O adapter 16 and communications adapter 13 are also interconnected to system bus 12. It should be noted that software components, including the operating system 41 and the application 40, are loaded into memory system 32 which is the computer system's main memory. I/O adapter 16 conventionally communicates with the disk storage device 15, i.e. a hard drive. Communications adapter 34 interconnects bus 12 with outside networks such as the internet enabling the data processing system to communicate with other such systems. Keyboard 20 is connected to system bus 12 via keyboard adapter 21. The present invention is embodied in the software program and any conventional touch screen display may be used. Typically, in FIG. 1, there is a display 17 having surface 19 upon which the visual output from the computer is generated via display adapter 14. A touch sensitive display screen or panel 10 is superimposed upon display surface 19. This touch screen which is about ¼" to ½" from surface 19 is responsive to a touch stimulus, e.g. finger 18, applied by the user to issue commands to the computer system. The touch screen 10 resolution is determined by digitizing circuitry (not shown) in a pointing device adapter 11 to form a two-dimensional array of discrete coordinate points. A touch stimulus applied to any of the coordinate points is detected by a sensor array (not shown) in the touch screen 10. The sensor array generates an analog signal responsive to the force imparted to the touch screen. This signal is digitized by a sampling A to D convertor circuit (not shown) in touch screen 10 to produce an input data value. This data value, together with the coordinates to which it relates, are transmitted from touch screen 10 to pointing device adapter 11. The input data value corresponding to each set of coordinates is conventionally refreshed by the A to D converter circuit about 60 times a second. The pointing device adapter 11 connected to the bus architecture 12 passes each set of coordinates and the corresponding input data value to the bus architecture 12.

The touch panels or screens 10 may use any of the standard technologies discussed above. In the present embodiment, higher resolution panels using resistive/conductive composites should provide best results. Such structures use two slightly separated layers of transparent material, one coated with a thin layer of conductive material and the other with resistive material. The pressure of the fingertip forces the layers to touch and the voltage drop across the resistive substrate is measured and used to determine the coordinates of the touched positions. There are many such conductive/resistive touch screen displays on the market which may be used in the implementation of the present invention such as the IBM 2489 Model 600 and PGI Super Nightingale.

There will now be described a simple illustration of the present invention with respect to the display screens of FIGS. 2 through 6. When the screen images are described, it will be understood that these may be rendered by storing image and text creation programs such as those in any conventional window operating system in the RAM 32 of the system of FIG. 1. The operating system is diagrammatically shown in FIG. 1 as operating system 41. The program of this invention for creating and controlling the on-screen finger mouse is shown as application 40. Display screen images are presented to the viewer on-screen 19 of display monitor 17 of FIG. 1. In accordance with the standard touch screen techniques described above, the user may control the screen interactively through finger 18 touching touch screen 10 which operates through pointing device adapter 11 and bus 12 to call upon the routines in application program 40 which is loaded in system RAM 32 cooperating with the operating system 41 to create the images display adapter 14 to control the display screen 19 on display monitor 38.

Figure 2:
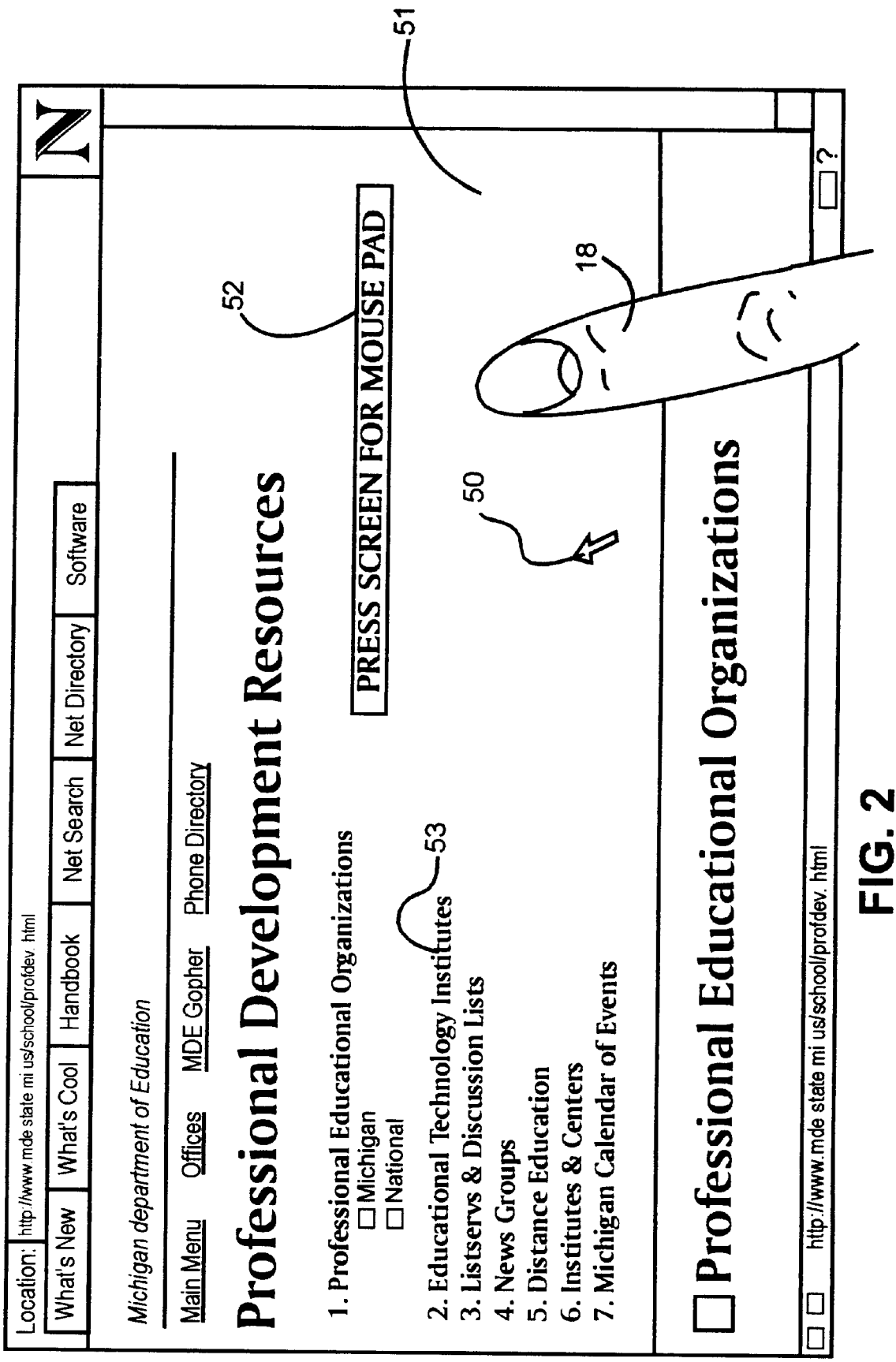
FIG. 2 is a diagrammatic view of a portion of a display screen on which information interactively accessible through a cursor is displayed together with a transparent superimposed touch panel.

The initial display screen of FIG. 2 shows a display screen 51 which for purposes of this example was received over the Internet. The user is interested in professional development and has received a page from the Michigan State Department of Education which is shown on-screen 51. The cursor or pointer 50 is at the position shown. The user is interested in activating link 53 for further information on Educational Technology Institutes. Thus, he needs to move pointer 50 to link 53. Instruction 52 advises the user to press the screen for the mouse pad. In accordance with the present invention, the user may randomly press any point on-screen 51 with his finger 18. He selects an area as shown which does not contain any data. On-screen finger mouse pad 54 appears, FIG. 3, together with on-screen instruction 56 which advises the user to roll his finger on the mouse pad 54 in the direction in which he wishes to move the pointer 50. It should be noted that the mouse pad 54 and the instruction 56 are on the screen 19 of display 17 of FIG. 1 together with cursor 50, as well as link 53 and all of the other data. Touch screen 10 is, of course, transparent. As will hereinafter be seen in greater detail, when the program is described, when the touch screen senses the touching of the screen by finger 18 which is shown centered at point 55, the information is conveyed via adapter 11 and bus 12 to the system memory on which the present program is loaded and the program sends appropriate commands via display adapter 14 to provide on-screen mouse pad 54 around center point 55 where the finger touched and provides instruction 56 to roll finger. The user follows this instruction, FIG. 4, in the direction toward link 53 which he wishes to move pointer 50. As finger 18 rolls, the portion of the tip of finger 18 which is in contact with the screen 51 moves for a distance and direction defined by dashed lines 57 and 57*a*, i.e. these dashed lines define the area in or adjacent to pad 54 which fingertip 18 will contact in its roll. This is, in effect, a short stroke across all of the touch sensitive pixels between lines 57 and 57*a*. From this sensed information, the distance and direction of vector V may be calculated. As a result of this finger roll or stroke, pointer 50 will be moved for a vector KV as shown to pointer position 50*a*. It should be noted that K is a constant preselected by the user to move the pointer for a convenient distance in the same direction and in proportion to the shorter finger roll or stroke. The constant K is adjustable by the user dependent upon the on-screen data need and distances.

Figure 4:
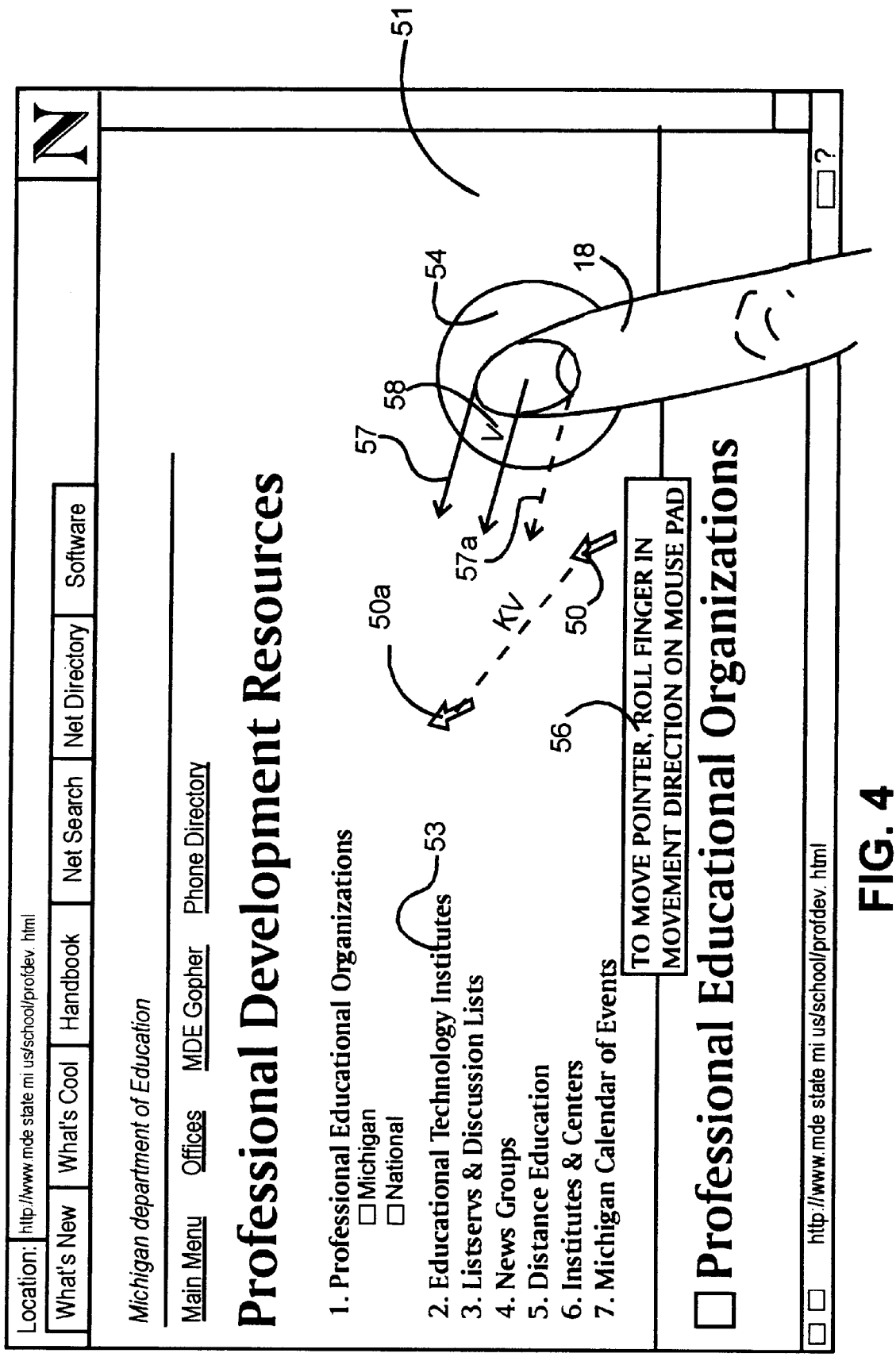
FIG. 4 is the display screen structure of FIG. 3 showing how finger movement within the mouse pad results in a corresponding movement of the cursor.
Figure 5:
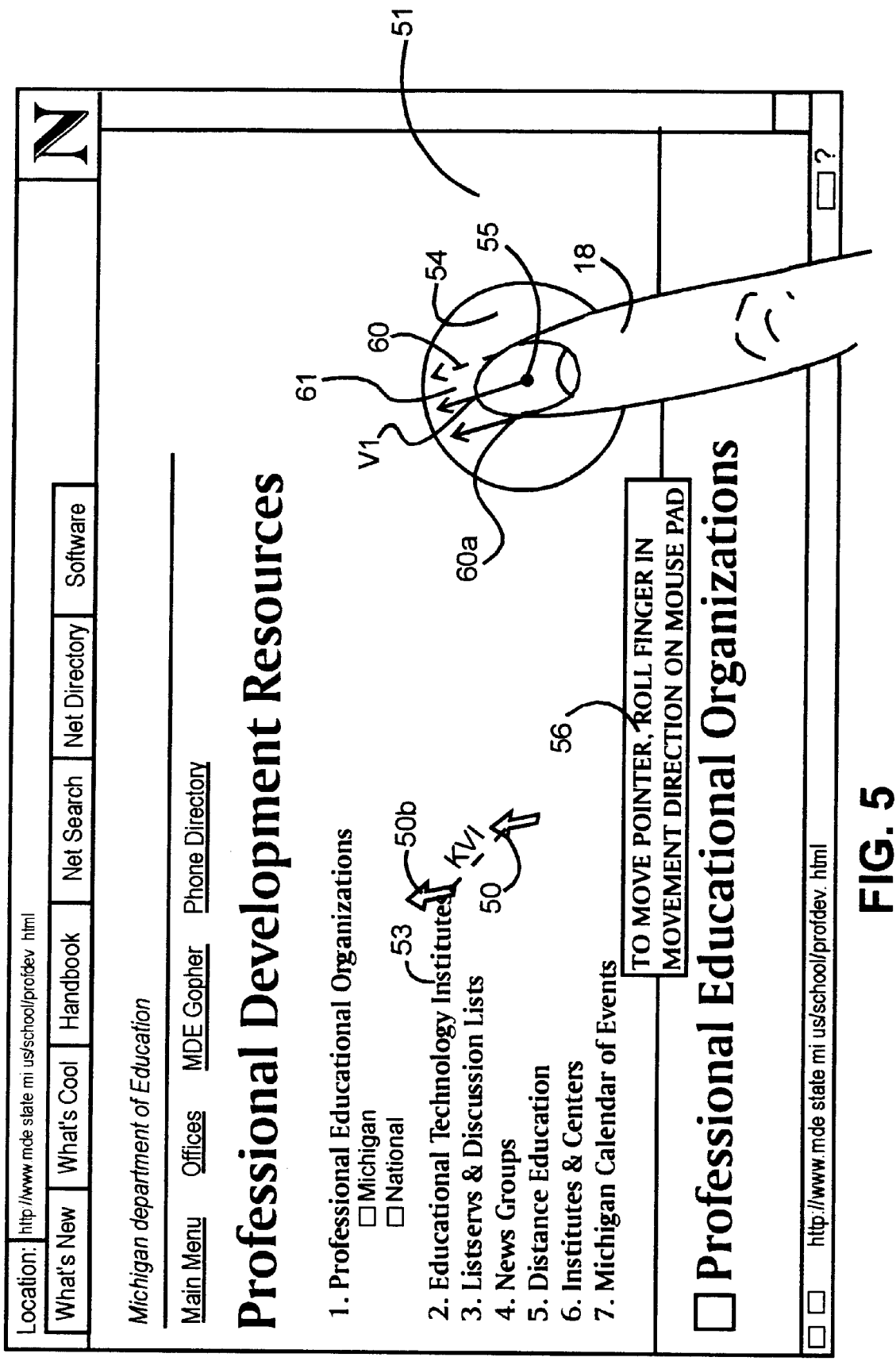
FIG. 5 is the display screen structure of FIG. 4 showing how a second iterative finger movement within the mouse pad results in a further sequential corresponding cursor movement.
Figure 6:
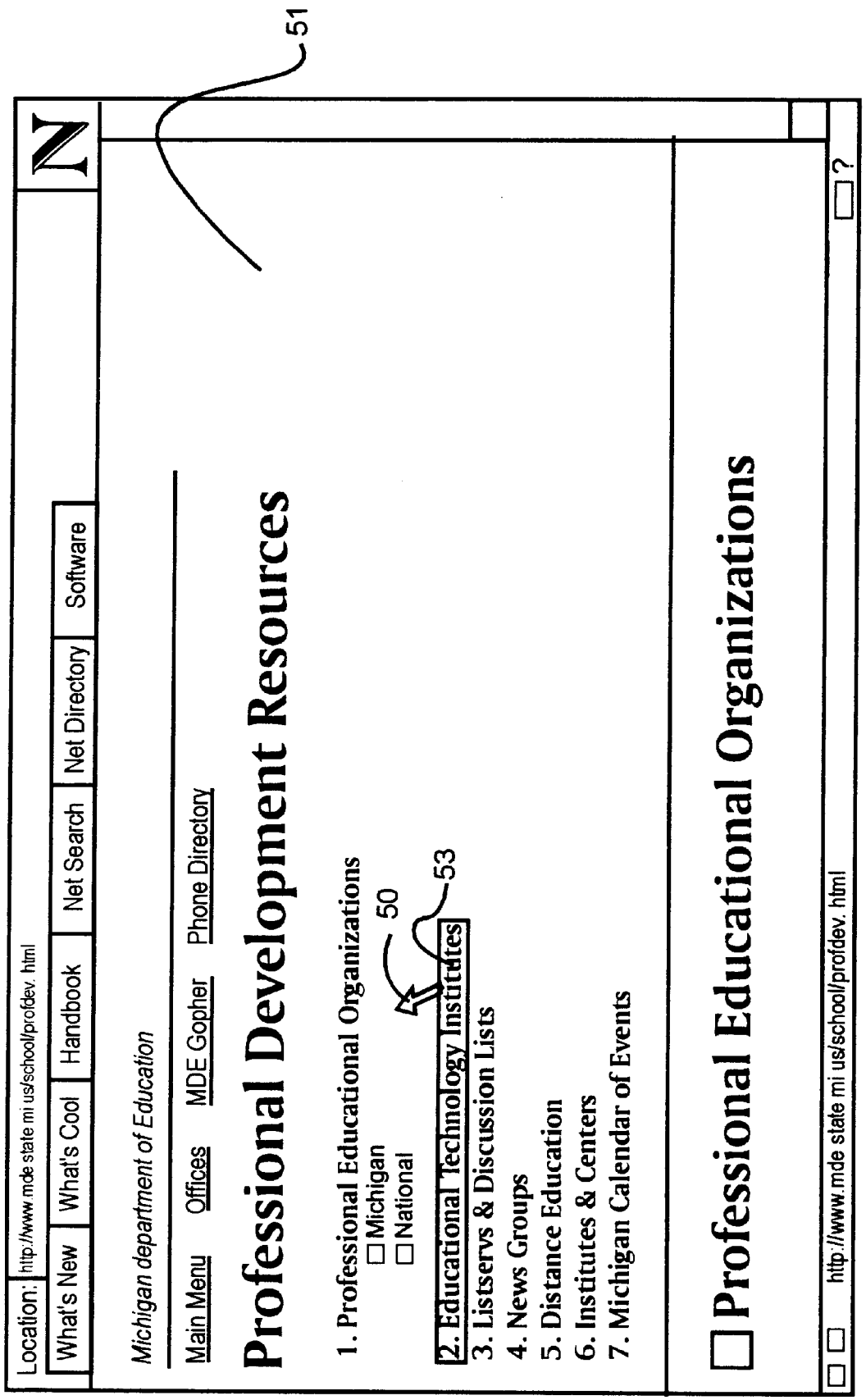
FIG. 6 is the display screen structure of FIG. 5 after the cursor movement of FIG. 5 has been completed and after an information object on the screen has been interactively selected.

Now with respect to FIG. 5, the cursor is now moved to the next position as indicated in FIG. 4 but it still has not reached link 53. Another stroke or roll of finger 18 is needed. The finger 18 is now rolled for a distance and direction defined by dashed lines 60 and 60*a*, i.e. these dashed lines define the area in or adjacent to pad 54 which fingertip 18 will contact in its roll which, in effect, is a short stroke across all of the touch sensitive pixels between lines 60 and 60*a*. From this sensed information, the distance and direction of vector V1 may be calculated. As a result of this finger roll or stroke, pointer 50 will be moved for a vector KV1, as shown, to pointer position 50*b*. It should be noted that K is the constant preselected by the user as set forth above. As a result of this second movement, pointer 50 has reached the desired link 53, as shown in FIG. 6. Link 53 may be turned on and, thus, highlighted as shown by the convenient means of clicking, e.g. clicking on center point 55 with finger 18. In this connection, the program routine may be conveniently set up to sense a click which could be a finger jab after a finger roll increment has been completed. The system will then go on to access the subject matter (not shown) linked to selected link 53.

For convenience in illustration, the pointer 53 has been shown as reaching the desired target after just two incremental movements. The movement may involve many increments. The key is that short incremental movement, e.g. rolls or strokes of the randomly placed finger mouse direct the pointer or cursor to eventually reach its target. It should further be noted that while the illustration involved the movement of a pointer, any form of data could be moved in any direction using the on-screen finger mouse of the present invention. For example, in scrolling of data, the mouse pad could be randomly placed at any point on the screen and then, through finger rolling, the whole screen of data could be scrolled in any direction. This last embodiment could be applicable to provide a touch screen for direction finder displays involving maps wherein the pad could be set up at any point and then scrolled in any desired direction.

Figure 9:
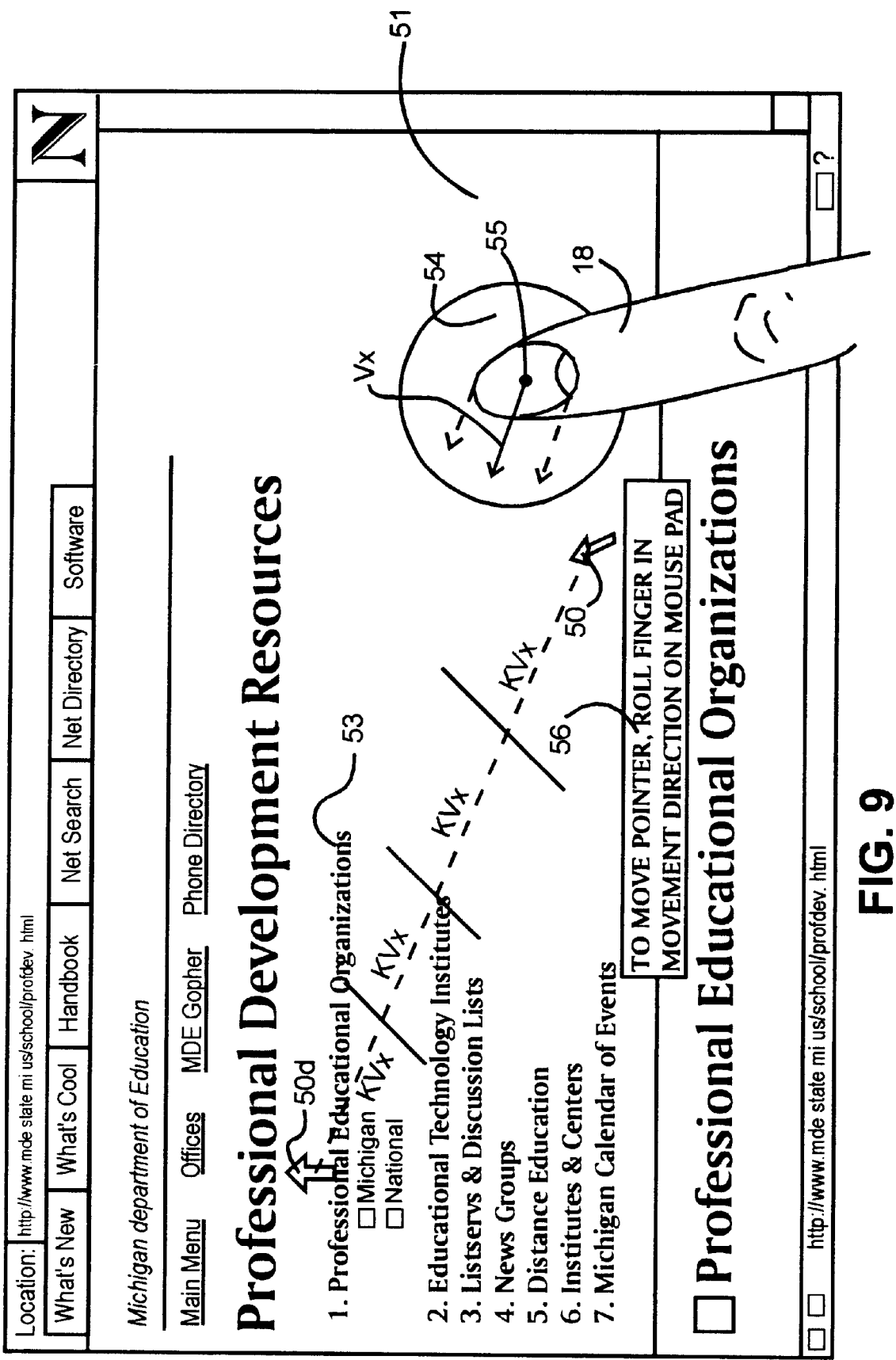
FIG. 9 is the display screen of FIG. 4, but showing how the mouse pad of the invention may be used to move the cursor to the destination item by a continuous movement of increments at a selected rate.

The above description used as an example the movement of the cursor in a plurality of variable increments to reach a selected screen element. Movement in such variable increments may be effectively used in many circumstances, e.g. when moving or scrolling in geographical location displays. However, in the situation described above where the target is in a substantially straight line direction from the initial cursor position, it would be advantageous to move the cursor to the target item by a continuous movement of increments at a selected rate. FIG. 9 shows such movement. In the example of FIG. 9, the initial mouse pad/finger position is the same as that of FIG. 4 and finger 18 is rolled through vector Vx. After the roll, the operator continues to depress finger 18. As long as finger 18 is depressed, the cursor 50 continues to move in repetitive increments KVx where K is a constant as described above until the cursor at position 50*d* has reached its destination item 53. At this point, the operator will lift finger 18 from the pad to indicate that the cursor has reached its destination. It should be noted that the rate of movement of increments KVx may be constant, or the rate may be made variable dependent upon the distance that finger 18 has rolled from its starting center point 18. For short rolls, the rate of movement may be slower so that the cursor movements may be finely tuned, while for longer finger rolls the rate may be greater so that longer distances may be covered within time frames.

Figure 3:
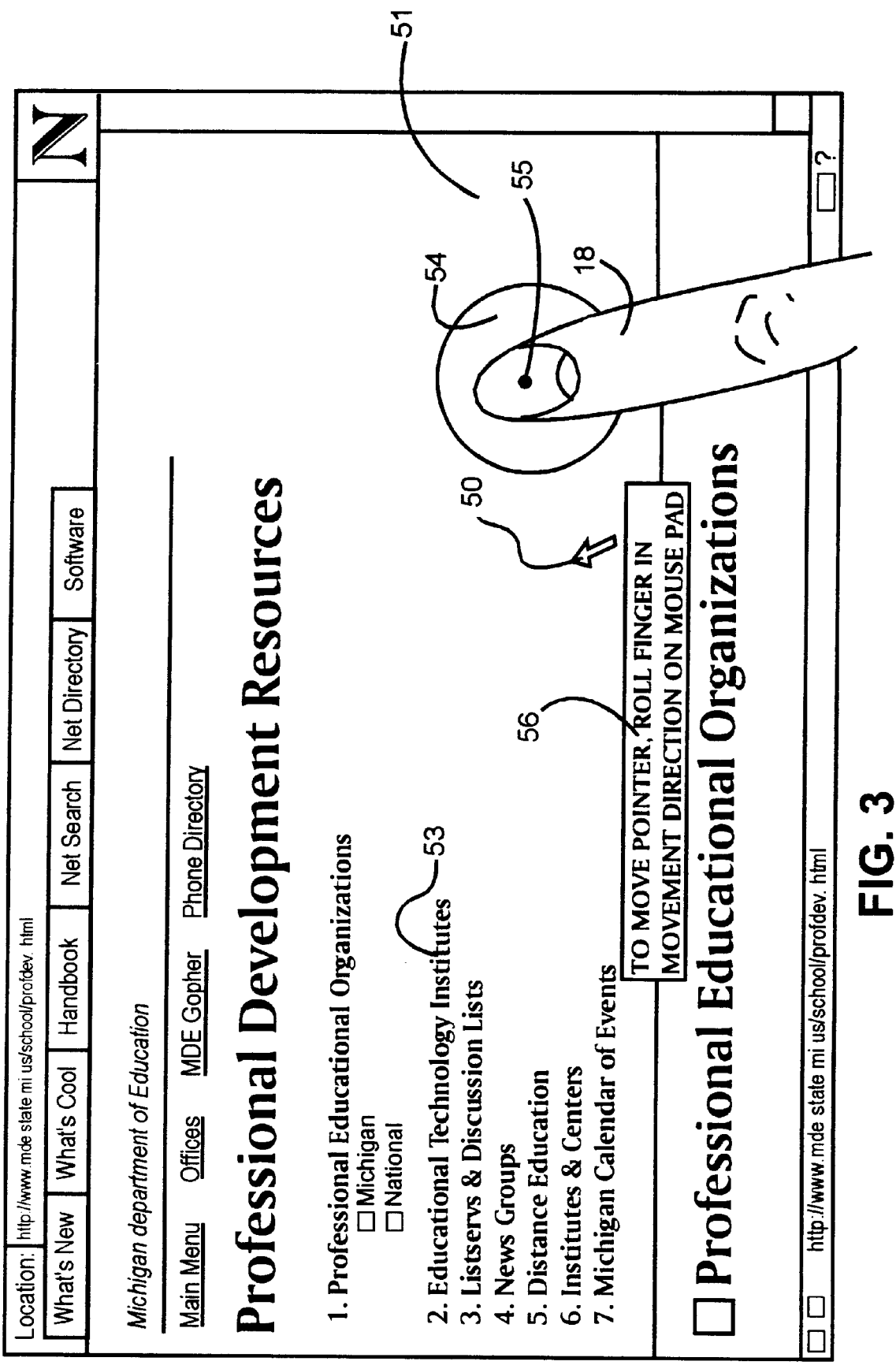
FIG. 3 is the display screen structure of FIG. 2 after the panel has been pressed to bring up a displayed mouse pad.
Figure 7:
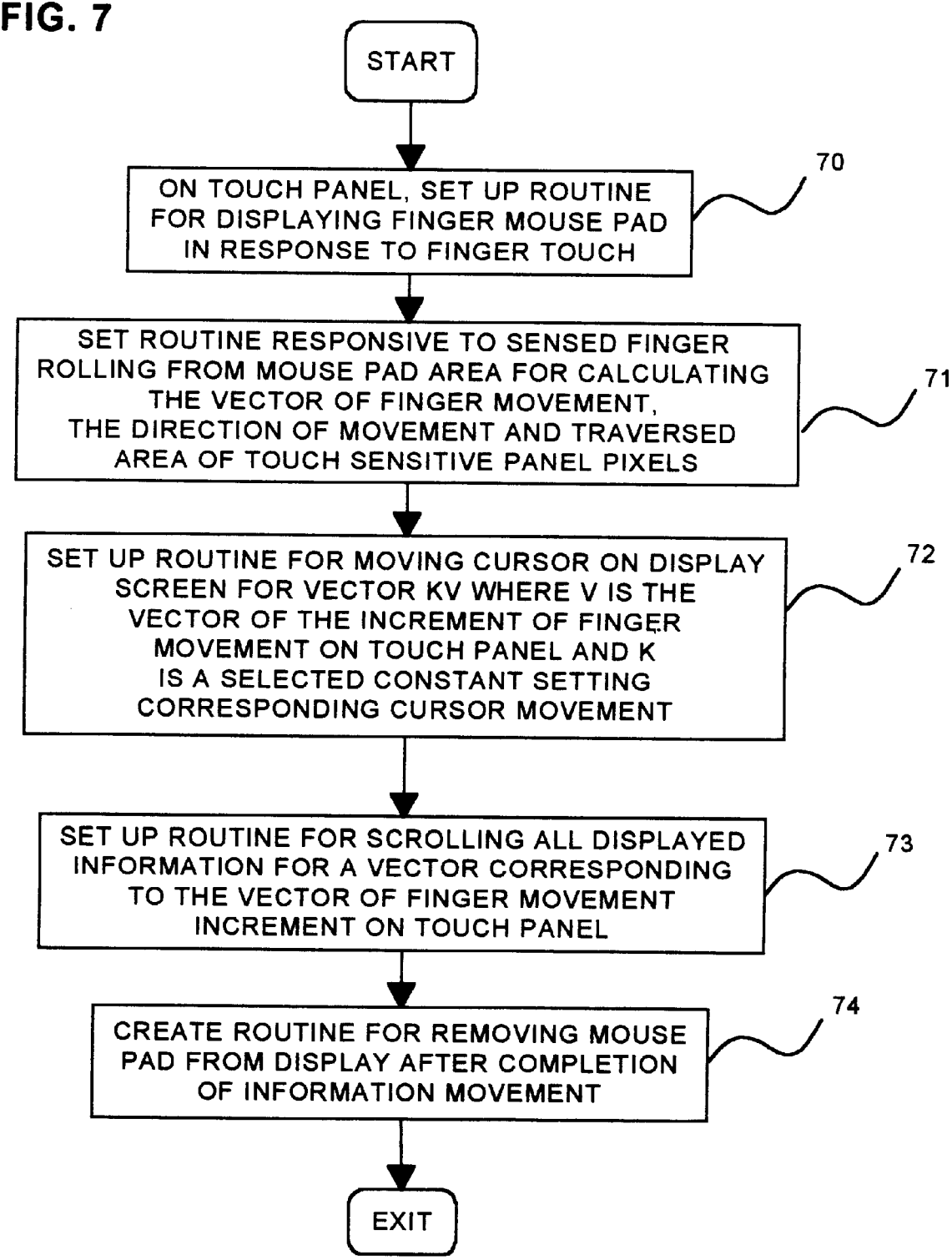
FIG. 7 is a flowchart showing the development of a program for controlling movement of information on the display screen structures of FIGS. 2 through 6 through the touch panel on-screen mouse of the present invention.

Now with reference to FIG. 7, we will describe a process implemented by a program according to the present invention for interactively generating an on-screen finger mouse pad and for controlling the movement of on-screen information in response to finger rolling and strokes. The program routines which are created by the process of FIG. 7 implement the operations described with respect to FIGS. 2 through 6. In the flowchart of FIG. 7, a basic interface routine is set up, step 70, whereby the operator may touch any convenient spot on the touch screen, and a finger mouse pad will be set up as shown in FIG. 3. Then, step 71, a routine is set up whereby the touch screen senses the touch screen pixels activated by a roll of the controlling finger in any direction and calculates the vector of finger movement from this information. This is the calculation of vector V, previously described with respect to FIG. 4. Then, step 72, a routine is set up for moving the cursor for the vector KV in response to this finger roll. This movement of the cursor or pointer is also shown and described with respect to FIG. 4. The routines of steps 71 and 72 are, of course, repeated for each incremental finger roll or stroke until the desired pointer or cursor target destination is reached.

Step 73 sets up a routine similar to that of step 72 but for the scrolling of a whole body of screen information along any incremental vector resulting from the associated finger roll. Lastly, step 74, a routine is set up for removing the mouse pad from the display upon the completion of the pointer movement or scrolling movement as shown in FIG. 6.

Figure 8:
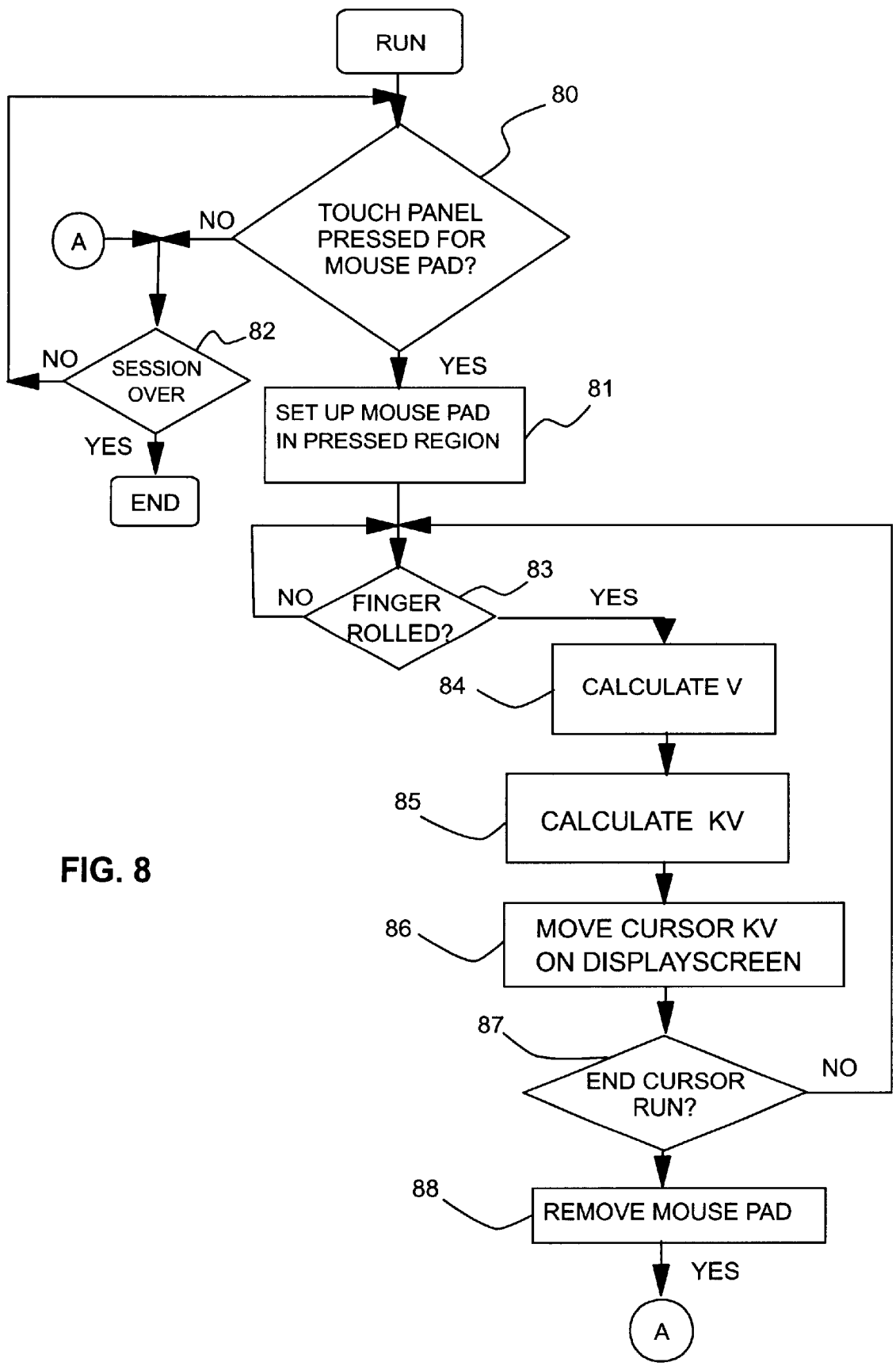
FIG. 8 is a flowchart showing the running of the program, the development of which has been described with respect to FIG. 7.

Now that the basic programs have been described and illustrated, there will be described with respect to FIG. 8, a flow of a simple operation showing how the program could be run to control a cursor or pointer movement. First, step 80, a determination is made as to whether the operator has touched the touch screen at any random point to set up a mouse pad. If No, a determination is made as to whether the session is over, step 82. If Yes, then the routine and session are ended. If the decision in step 82 is No, then flow returns to step 80 and the system is set up to await the screen touch which will set up the mouse pad. When the decision from step 80 is Yes, i.e. a pad has been requested, a pad is set up, step 81, in the pressed region as shown in FIG. 3, and a determination is made, step 83, as to whether there is any finger rolling. If No, the waiting continues. If Yes, then, step 84, the vector V of the increment finger movement is calculated, FIG. 4. Then, step 85, the increment of pointer movement KV is calculated, FIG. 4, and, step 86, the pointer is moved for KV on-screen. At this point a determination is made, step 87, as to whether the cursor or pointer has reached the end of its run, i.e. its target. If Yes, as in FIG. 6, the on-screen mouse pad is removed, step 88, and the flow is returned via branch A to step 82 where a determination is made as to whether the session is over. If No, then the above-described procedure is continued until the end of the session.

Although certain preferred embodiments have been shown and described, it will be understood that many changes and modifications may be made therein without departing from the scope and intent of the appended claims.

What is claimed is:

1. In a computer controlled display system with a user interactive touch display screen:

means for displaying data on said screen, means for sensing the placement of a user's fingertip adjacent said display screen, means activated by said sensing means for enabling the detection of any rolling of said placed fingertip in an orthogonal direction, and means responsive to the detection of said rolling of said placed fingertip for moving said displayed data in an orthogonal direction corresponding to the direction of said rolling.

2. The computer controlled display system of claim 1 wherein said moved displayed data is a screen cursor.

3. The computer controlled display system of claim 2 wherein said finger is placed at a display screen position remote from the position of said cursor on said display screen.

4. The computer controlled display system of claim 1 wherein said moved displayed data is data being scrolled in said orthogonal direction.

5. The computer controlled display system of claim 1 further including means activated by said sensing means for displaying an object indicating that said means for detecting said rolling is enabled.

6. The computer controlled display system of claim 5 wherein said displayed object is pad image enclosing said placed fingertip.

7. The computer controlled display system of claim 6 wherein:

said touch screen is pressure sensitive, and further including means responsive to a subsequent pressing of said placed fingertip for interactive user input.

8. In a computer controlled display system having a user interactive touch screen, a method for user interactive movement of displayed data comprising:

displaying data on said screen, sensing the placement of a user's fingertip adjacent said display screen, in response to said sensing, enabling the detection of any rolling of said placed fingertip in an orthogonal direction, and moving said displayed data in an orthogonal direction corresponding to the direction of said rolling in response to a detection of said rolling of said placed fingertip.

9. The method of claim 8 wherein said moved displayed data is a screen cursor.

10. The method of claim 9 wherein said finger is placed at a screen position remote from the position of said cursor.

11. The method of claim 8 wherein said moved displayed data is data being scrolled in said orthogonal direction.

12. The method of claim 8 further including the step of displaying an object indicating that said means for detecting said rolling is enabled in response to said sensing.

13. The method of claim 12 wherein said displayed object is pad image enclosing said placed fingertip.

14. The method of claim 13 wherein:

said touch screen is pressure sensitive, and further including the step of enabling an interactive user input in response to a subsequent pressing of said placed fingertip.

15. A computer controlled display program having program code included on a computer readable medium for the interactive control of a user interactive touch screen comprising:

means for displaying data on said screen, means for sensing the placement of a user's fingertip adjacent said display screen, means activated by said sensing means for enabling the detection of any rolling of said placed fingertip in an orthogonal direction, and means responsive to the detection of said rolling of said placed fingertip for moving said displayed data in an orthogonal direction corresponding to the direction of said rolling.

16. The computer program of claim 15 wherein said moved displayed data is a screen cursor.

17. The computer program of claim 16 wherein said finger is placed at a screen position remote from the position of said cursor.

18. The computer program of claim 15 wherein said moved displayed data is data being scrolled in said orthogonal direction.

19. The computer program of claim 15 further including means responsive to said sensing means for displaying an object indicating that said means for detecting said rolling is enabled.

20. The computer program of claim 19 wherein said displayed object is pad image enclosing said placed fingertip.

21. The computer program of claim 20 wherein:

said touch screen is pressure sensitive, and said program further includes means responsive to a subsequent pressing of said placed fingertip for interactive user input.

* * * * *